United States Patent
Capik et al.

(10) Patent No.: US 6,760,502 B2
(45) Date of Patent: Jul. 6, 2004

(54) POWER MONITORING ARRANGEMENT FOR OPTICAL CROSS-CONNECT SYSTEMS

(75) Inventors: Ronald J. Capik, Fords, NJ (US); Byung H. Lee, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 143 days.

(21) Appl. No.: 10/006,175

(22) Filed: Dec. 4, 2001

(65) Prior Publication Data

US 2003/0103716 A1 Jun. 5, 2003

(51) Int. Cl.⁷ ............................. G02B 6/26; G02B 6/42; H04B 10/08; H04B 17/00
(52) U.S. Cl. ............................ 385/17; 385/18; 385/19; 385/20; 398/17; 398/19
(58) Field of Search .................... 385/16–24; 398/2, 398/13, 17, 19, 20, 25, 38

(56) References Cited

U.S. PATENT DOCUMENTS

| | | | |
|---|---|---|---|
| 5,206,597 A | | 4/1993 | Rivera et al. ............... 324/664 |
| 6,064,501 A | * | 5/2000 | Roberts et al. ............. 359/110 |
| 6,449,406 B1 | * | 9/2002 | Fan et al. .................... 385/17 |
| 2002/0141009 A1 | * | 10/2002 | Yu et al. ..................... 359/110 |

OTHER PUBLICATIONS

Demonstration of a Very Low–Loss, 576x576 Servo–Controlled, Beam–Steering Optical Switch Fabric, B.H. Lee and R.J. Capik, (presented at the 26th European Conference on Optical Communication, Sep. 3–7, 2000, Munich, Germany).

* cited by examiner

Primary Examiner—Brian Healy
Assistant Examiner—Kevin S. Wood

(57) ABSTRACT

A method and apparatus for measuring optical power or insertion loss within an optical cross-connect system utilizing a plurality of parallel light beams sampled at switch fabric input and output portions via imaging devices.

18 Claims, 6 Drawing Sheets

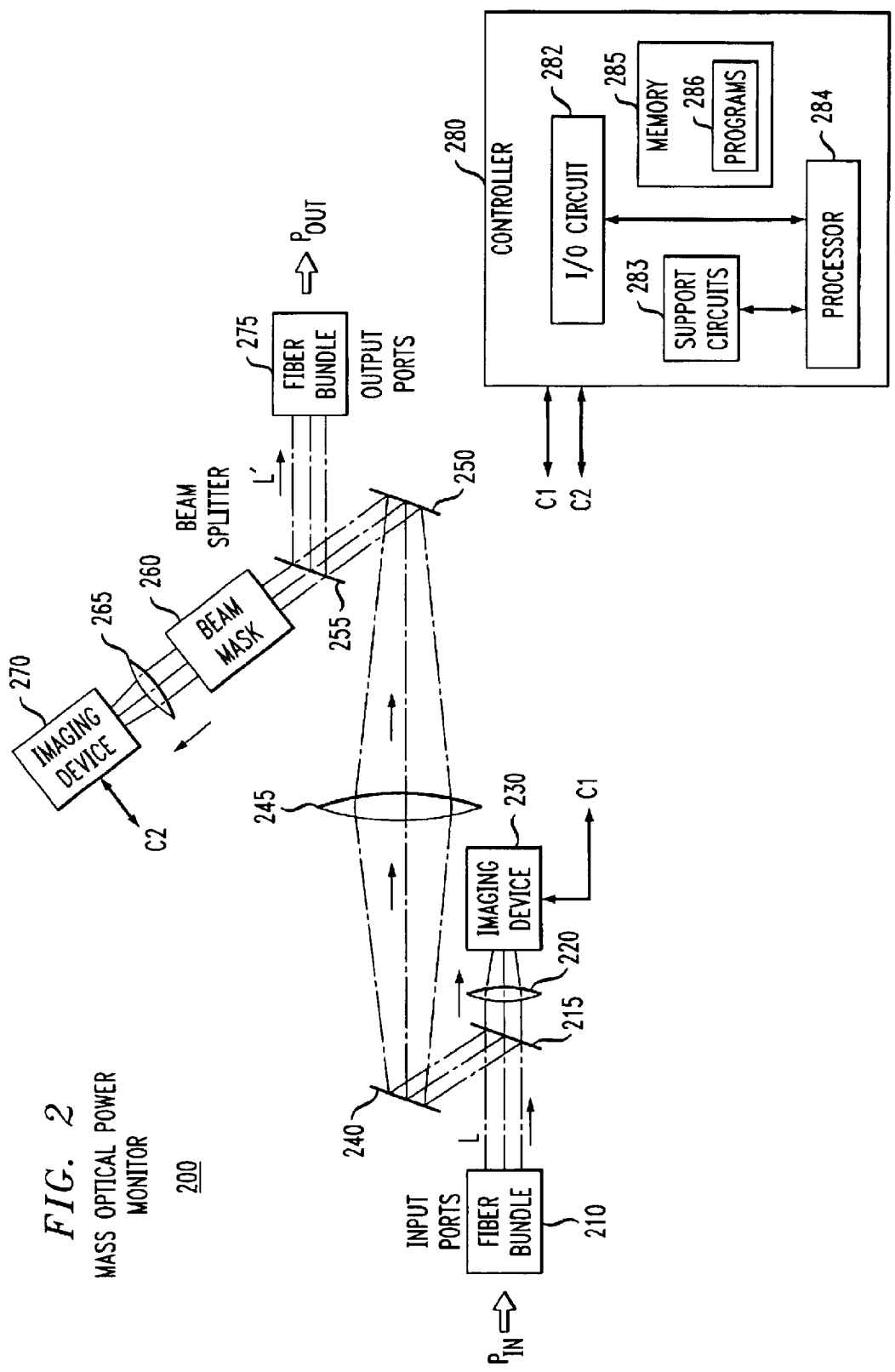

210, 275

210, 275

PARALLEL LIGHT PATHS

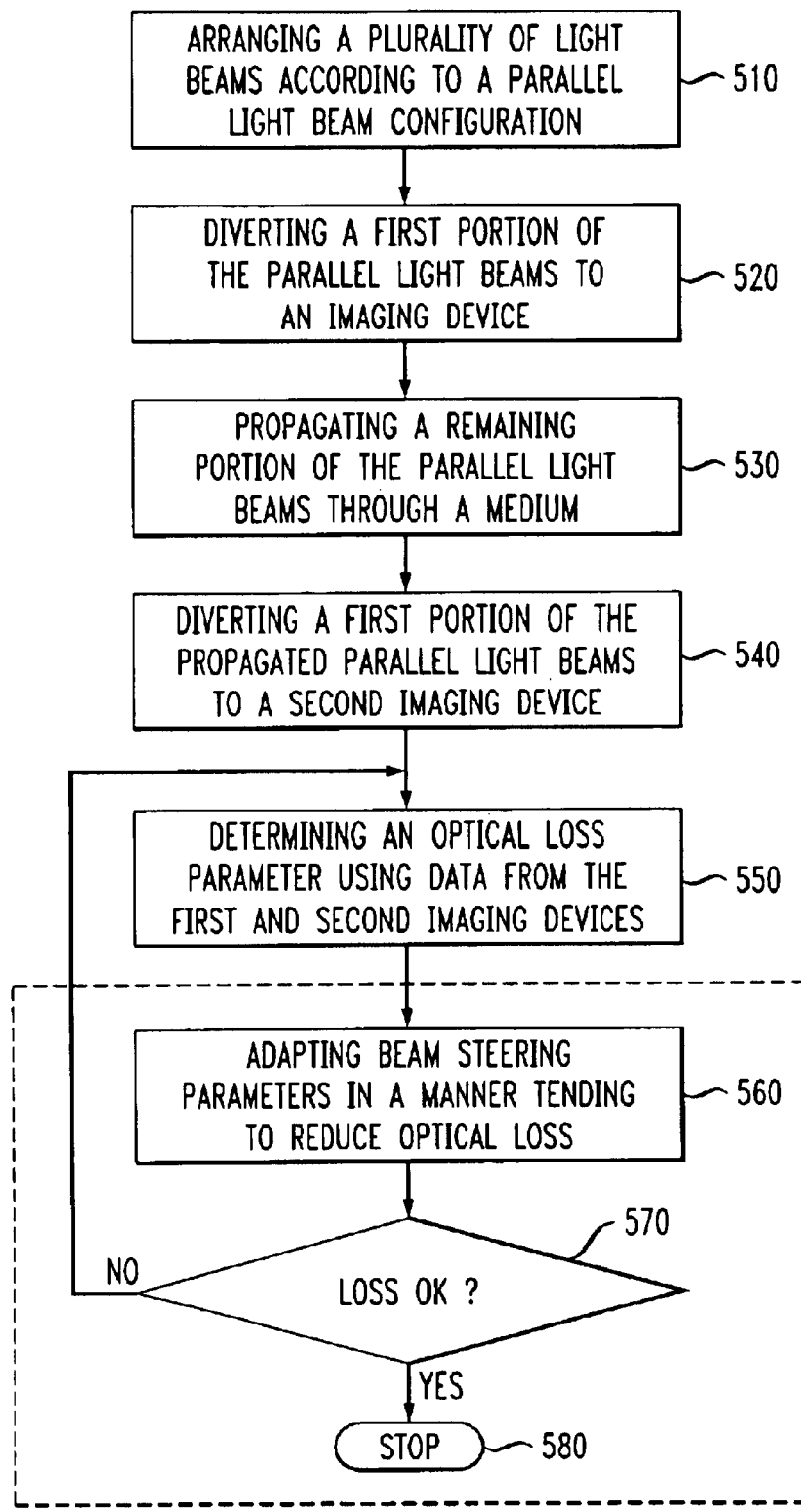

POWER MONITORING ARRANGEMENT FOR OPTICAL CROSS-CONNECT SYSTEMS

FIELD OF THE INVENTION

The invention relates generally to an optical communication system and, more particularly, to a power monitoring arrangement suitable for use within a free-space optical switching system.

BACKGROUND OF THE INVENTION

Optical switching including free-space, beam-steering optics is known. Beam-steering switches are capable of providing a large number of connections within a single stage because each of the individual input and output ports may be configured to a very large number of states. For example, an optical beam from a specified input port may be steered to different angles, thus directing the beam to a large number of output ports.

To ensure that the beam-steering switches direct as much optical energy from an input port to an output port, a training process is utilized whereby optical signals propagated through a switch fabric by various beam-steering switches are measured prior to communication to an input node and after communication to an output node to determine beam attenuation or insertion loss associated with each connection.

A conventional optical power monitor comprises a power tap, which diverts a portion of an optical signal to an optical to electric (O/E) converter such as a p-i-n diode. The p-i-n diode provides a signal that is processed by a transimpedance amplifier to produce therefrom an output signal suitable for processing by a controller to determine therefrom a power level.

Typically, each of N input ports and M output ports of an N×M optical cross connect are associated with a respective optical power monitor. A conventional optical power monitor is provided at each of the N input ports and M output ports to facilitate input and output power measurements and derive therefrom insertion loss data associated with each optical connection within a switch fabric. Unfortunately, the cost of performing such power monitoring is relatively high.

SUMMARY OF THE INVENTION

The invention provides a method and an apparatus for measuring optical power within, for example, an optical cross-connect system.

Specifically, a method according to an embodiment of the invention comprises arranging a plurality of light beams according to a parallel configuration; diverting a first portion of the parallel light beams to a first imaging device; propagating a remaining portion of the parallel light beams through a medium; diverting a first portion of the propagated parallel light beams to a second imaging device; and determining an optical loss parameter using imaging data provided by the first and second imaging devices.

BRIEF DESCRIPTION OF THE DRAWINGS

So that the manner in which the above-recited features, advantages and objects of the present invention attained and can be understood in detail, a more particular description of the invention, briefly summarized above, may be had by reference to the embodiments thereof which hare illustrated in the appended drawings. It is be noted, however, that the appended drawings illustrate only typical embodiments of this invention and are therefore not to be considered limiting of this scope, for the invention may admit to other equally effective embodiments.

FIG. 2 depicts a high level block diagram of an optical switch including power monitoring apparatus according to the invention;

FIG. 5 depicts a flow diagram of a method according to the present invention.

To facilitate understanding, identical reference numerals have been used, where possible, to designate identical elements that are common to the figures.

DETAILED DESCRIPTION OF THE PREFERRED EMBODIMENTS

Figure 1:
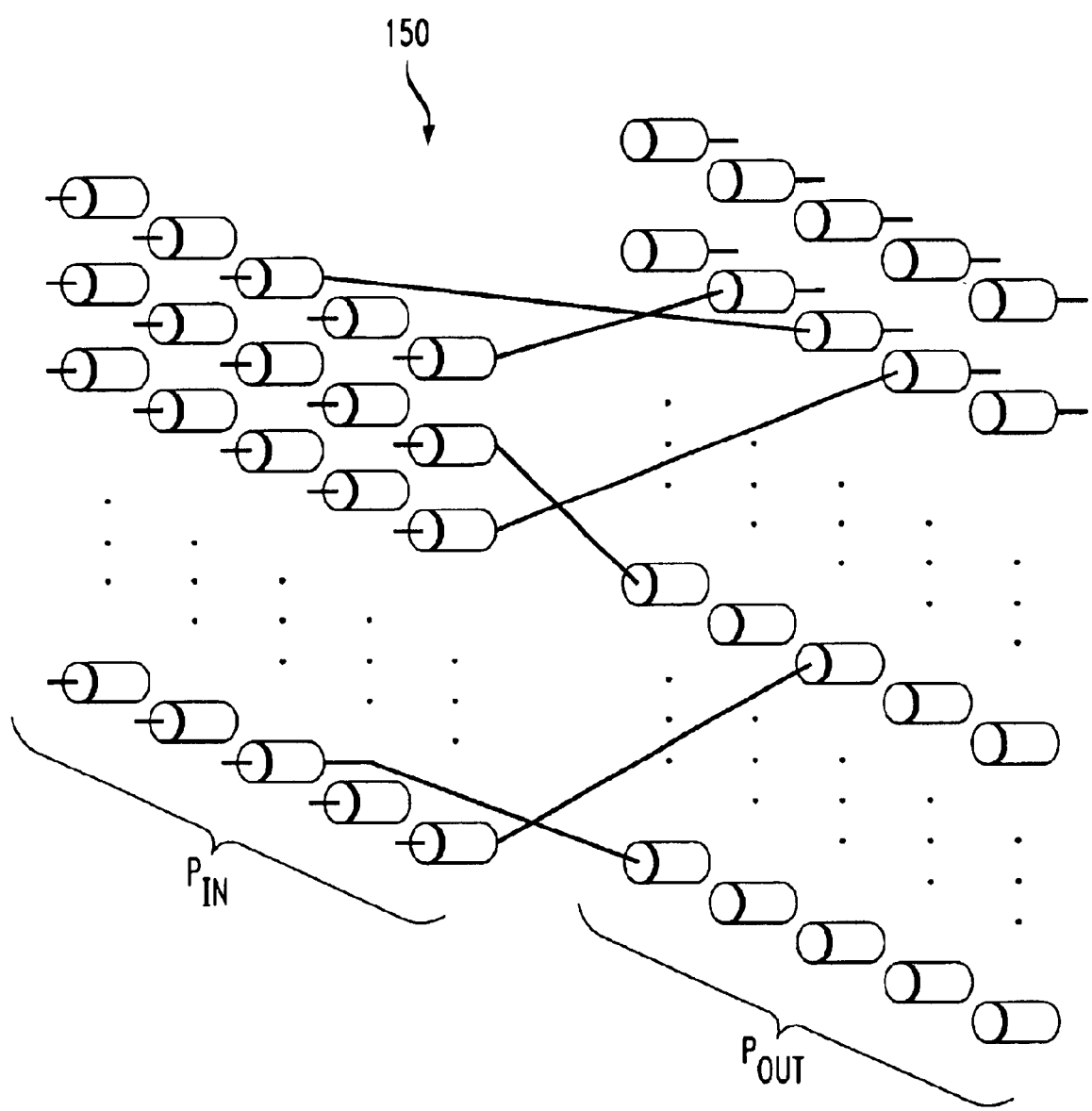
FIG. 1 depicts a graphical representation of a single stage free-space optical cross-connect.

FIG. 1 depicts a high level representation of a single-stage optical cross-connect 100 having a number of input ports $P_{in}$ and a number of output ports $P_{out}$. In this example, the input and output ports $P_{in}$ and $P_{out}$ are arranged in two-dimensional arrays, with a free-space region 150 disposed therebetween. Each of the input ports $P_{in}$ can be connected to each of the output ports $P_{out}$ and a number of possible connections is given by the product of the number of input ports $P_{in}$ and the number of output ports $P_{out}$.

One embodiment of the optical cross-connect 100 of FIG. 1 is based on servo-controlled fiber-collimator-lens assemblies, which are made up of input, or output fibers kept coupled to respective collimator lenses. Connections are made in such an optical cross-connect by addressing an input port to direct an optical beam to a desired output port, and addressing the desired output port to steer and receive the optical beam from the specified input port. Description of a servo-controlled, beam-steering optical switch may be found in "Demonstration of a Very Low-Loss, 576×576 Servo-Controlled, Beam-Steering Optical Switch Fabric," (presented at the 26th European Conference on Optical Communication, Sep. 3–7, 2000, Munich, Germany) and in U.S. Pat. No. 5,206,597, entitled "Free-Space Optical Switching Apparatus," issued on Apr. 27, 1993, both of which are incorporated herein by reference in their entireties.

FIG. 2 depicts a high-level block diagram of an optical switch including power-monitoring apparatus according to the invention. Specifically, the optical switch 200 of FIG. 2 comprises a first beam splitter 215, a first lens 220, a first imaging device 230, a first mirror 240, a second lens 245, a second mirror 250, a second beam splitter 255, a beam mask 260, a third lens 265, a second imaging device 270 and an optional controller 280. Optical energy is conveyed to and from the switching apparatus via, respectively, a plurality of optical fibers that are physically arranged as an input fiber bundle 210 and an output fiber bundle 275.

An exemplary optical fiber bundle is described in more detail below with respect to FIG. 4. Briefly, an optical fiber bundle comprises a plurality of optical fibers physically disposed in a parallel manner such that a corresponding plurality of parallel light beams may be produced. The bundle of optical fibers 210 provides a plurality of parallel light beams L which are directed towards the first beam splitter 215.

The first beam splitter 215 redirects, illustratively, 99% of the optical power provided by the parallel light beam to the first mirror 240, and directs 1% of the optical power provided by the parallel light beams L to the first lens 220. The first lens 220 directs the diverted portion (i.e., the 1% split portion) of the parallel light beams L to the first imaging device 230. The first imaging device 230 receives the parallel light beams L and determines a power level or measurement associated with one or more of the individual parallel light beams or the total (i.e., aggregate) power level of measurement associated with all of the parallel light beams L. In the case of the first imaging device 230, the determined power level may be used to approximate the input power applied to the optical switch 200 of FIG. 2.

The first mirror 240 reflects the non-diverted portion (i.e., the 99% split portion) of the parallel light beams L to the second mirror 250 via the second lens 245. The second mirror 250 reflects the non-diverted portion of the light beams L to the second beam splitter 250. The second beam splitter 250 directs, illustratively, 99% of the optical power within the non-diverted light beams L to the fiber bundle 275 associated with the output ports as parallel light beams L'. The second beams splitter 255 diverts, illustratively, 1% of the non-diverted parallel light beams L to the second imaging device 270 via the beam mask 260 and third lens 265.

The second imaging device 270 operates in substantially the same manner as the first imaging device 230. In the case of the second imaging device 270, the determined power level may be used to approximate the output power provided via the optical switch 200 of FIG. 2. The differences between the output power determined by the second imaging device and the input power determined by the first imaging device 230 may be used to determine an insertion loss or optical attenuation factor associated with the switched path with an optical switch 200.

Advantageously, by utilizing a plurality of light beams in parallel rather than a single light beam, the amount of energy propagated through the various optical switch component and measured by the first and second imaging devices is relatively high, thereby enabling more accurate optical power measurements. This accuracy enables more accurate adjustment of various optical switch components (e.g., beam steering component adjustments) in a training made of operation.

The optional controller 280 of FIG. 2 comprises a processor 284 as well as memory 285 for storing various power level determining and/or processing programs, control programs, training programs and the like 286. The processor 284 cooperates with conventional support circuitry 283 such as power supplies, clock circuits, cache memory and the like as well as circuits that assist in executing the software routines stored in memory 285. As such, it is contemplated that some of the process steps discussed herein as software processes may be implemented within hardware, for example, as circuitry that cooperates with the processor 284 to perform various steps. The controller 280 also contains input/output (I/O) circuitry 282 that forms an interface between the various functional elements within the switch 200 of FIG. 2. For example, in the embodiment of FIG. 2, the optional controller 280 communicates with the first imaging device 230 via a first communication link C1, and with the second imaging device 270 via a second communication link C2. The controller 280 retrieves raw imaging data from the imaging devices and processes the raw imaging data to produce therefrom power measurement determinations. Alternatively, the imaging devices provide power level determinations directly to the controller 280. It is noted that the input power measurement provided by a first imaging device 230 and the output power measurement provided by second imaging device 270 may be used to calculate insertion loss and other parameters associated with the switch 200 of FIG. 2.

Although the controller 280 of FIG. 2 is depicted as a general purpose computer that is programmed to perform various functions in accordance with the present invention, the invention can be implemented in hardware as, for example, an application specific integrated circuit (ASIC). As such, process steps described herein are intended to be broadly interpreted as being equivalently performed by software, hardware, or combination thereof.

Figure 3A:
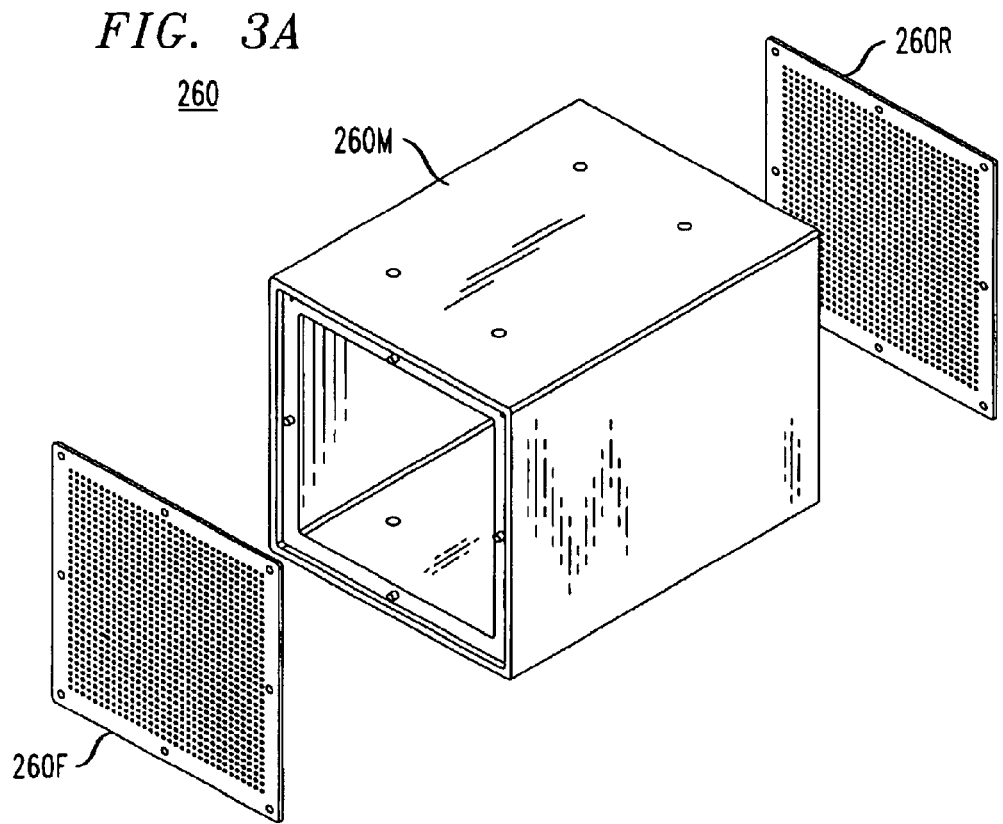
FIG. 3 depicts a graphical representation of a beam mask suitable for use in the optical power monitor of FIG. 2.
Figure 3B:
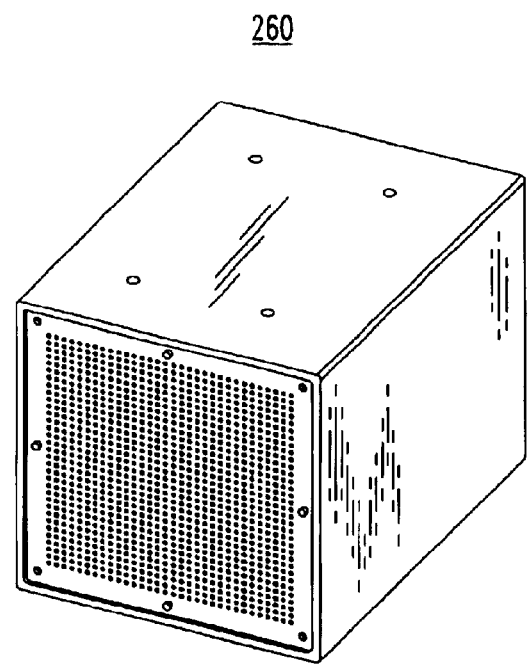

FIGS. 3A and 3B depict isometric views of, respectively, a disassembled and an assembled exemplary beam mask suitable for use in the switching apparatus of FIG. 2. Specifically, the beam mask 260 of FIG. 2 operates to substantially ensure that only parallel light beams (i.e., no scattered or mis-aligned beams) are transmitted from the second beam splitter 255 to the third lens 265. In this manner, the optical energy associated with each beam of light within the non-diverted light beams L may bee associated with a corresponding beam of light within the diverted light beams applied to the first NIR camera 230. Thus, given a plurality of light beams within the parallel light beams L, the input optical energy of individual or aggregated light beams (as measured at first imaging device 230) may be correlated with the output optical energy associated with respective individual or aggregated light beams (as measured at second imaging device 270).

The beam mask 260 of FIG. 3A comprises a front portion 260F, a middle portion 260M and a rear portion 260R. The front 260F and rear 260R portions comprise substantially identical grids, which are brought into optical alignment via the middle portion 260M. A completed beam mask 260 is shown in FIG. 3B. Parallel light beams traverse corresponding grid holes within the front 260F and rear 260R portions of the beam mask.

In a preferred embodiment, the beam mask 260 comprises the "pin hole grid" configuration depicted in FIG. 3 due to the relatively low cost of this configuration. However, to avoid "angled" or off-axis beams, the beam mask 260 may be constructed using laser bored holes rather than pinholes. Optionally, a microlens array similar to a collimator may be used. A microlens array with pinholes to provide spatial filtering may also be used. In any event, the beam mask 260 operates to substantially reduce the amount of non-parallel light beam energy passed to the second imaging device.

Figure 4A:
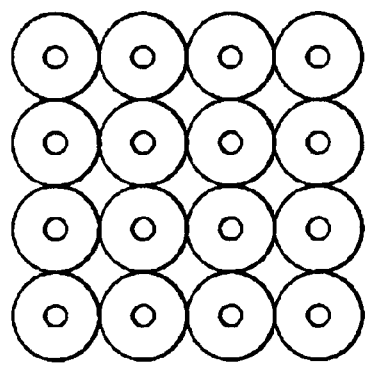
FIG. 4 depicts a graphical representation of the plurality of optical fibers arranged as an optical fiber bundle.
Figure 4B:
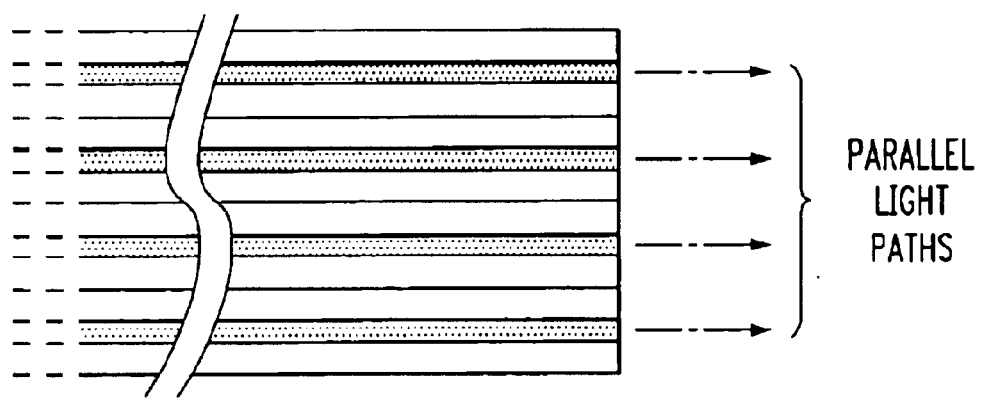

FIG. 4A depicts a cross sectional view of a plurality of optical fibers arranged as an optical fiber bundle. FIG. 4B depicts an exemplary side view of the optical fiber bundle of FIG. 4A. Specifically, an optical fiber bundle comprises a plurality of optical fibers physically disposed in a parallel manner, such as shown in the side view of FIG. 4B. In the case of an optical fiber bundle comprising an N×N bundle of fibers (illustratively a 4×4 bundle comprising 12 optical fibers), a cross-sectional view of the optical fiber bundle is represented in FIG. 4A. It is noted that the optical fiber bundles depicted in FIGS. 4A and 4B are suitable for use in the optical switch 200 of FIG. 2 as input optical fiber bundle 210 and output optical fiber bundle 275.

FIG. 5 depicts a flow diagram of a method according to the present invention. Specifically, the method 500 of FIG.

5 is used to determine an optical loss parameter of a medium, such as a free-space optical medium within an optical cross-connect system.

The method is entered as step 510, where a plurality of light beams is arranged according to a parallel light beam configuration. That, is, at step 510 the plurality of light beams are arranged in a parallel manner such as described above with respect to FIG. 4. Such parallel light beam configuration may be affected by a fiber bundle, a collimator or other physical positioning and/or aiming apparatus.

At step 540, a first portion of the optical energy associated with the parallel light beams is diverted to an imaging device. Illustratively, at step 520 a splitter or other optical processing device capable of diverting a portion of the optical energy associated with the parallel light beams is diverted to a suitable imaging device, such as the first imaging device 230. Briefly, a suitable imaging device comprises an imaging device including a plurality of optical receivers having a relatively high sensitivity to optical energy within the spectral region occupied by the parallel light beams. It is noted that a suitable imaging device also includes, or is operatively coupled to, apparatus capable of processing image information generated in response to the diverted first portion of the parallel light beams such that at least an optical power level or parameter may be determined.

At step 530, the remaining portion of the parallel light beams is propagated through a medium. That is, at step 530, the non-diverted portion of the parallel light beams (i.e., the portion not diverted to the first imaging device) is propagated through a medium such as a free-space medium within an optical cross-connect via, for example, one or more aiming devices such as MEMS mirrors. It is noted that the medium may comprise a free-space medium or any other medium allowing optical propagation (e.g., glass, plastic, and the like).

At step 540, a first portion of the propagated parallel light beams is diverted to a second imaging device. Illustratively, at step 540 an optical beam splitter or other appropriate device diverts a first portion of the propagated parallel light beams. The second imaging device may operate in a manner similar to that described above with respect to the first imaging device. The second imaging device has associated with it control apparatus suitable for determining an optical power level based upon the optical energy imparted to an imaging surface therein.

At step 550, an optical loss parameter is determined using data provided by the first and second imaging devices. That is, at step 550, optical power measurements or determinations provided by measurement apparatus associated with the first and second imaging devices is used to determine the amount of optical attenuation experienced by the parallel light beams propagated through the medium and, optionally, any aiming devices.

At optional step 560, beam steering parameters are adapted in a manner tending to reduce the optical loss determined at step 550. That is, at step 560 mirrors or other beam steering devices are adapted in a manner tending to reduce the optical loss experienced by the parallel light beams traverse in a medium caused by, for example, misalignment of mirrors or other optical processing anomalies. At optional step 570, a determination is made as to whether the presently achieved level of optical loss is acceptable. If the loss is acceptable, then the method exits at step 580. If the loss is not acceptable, then steps 550 and 560 are repeated.

Optionally, step 540 includes an additional step of filtering non-parallel optical energy proximate the parallel light beams provided to the second imaging device. Such filtering may be affected by the beam mask 260 described above with respect to FIGS. 2 and 3.

The operation of the imaging devices 230 and 270 will now be discussed in more detail. Each of the imaging devices 230 and 270 receive onto respective imaging surfaces parallel beams of light. Each of the received parallel beams of light received onto the imaging surface excites surface materials associated with one or more picture elements (pixels). The pixels are operatively coupled to a control device and arranged in, preferably, a grid of pixels. The imaging devices 230 and 270 may comprise, illustratively, near infra-red (NIR) cameras.

Each imaging device 230 and 270 may include a respective control device for processing received energy as indicated by pixel energy levels to produce therefrom an indication of the total optical power applied to the NIR camera. Alternatively, each imaging device may supply to a remote controller information indicative of the amount of optical power applied to each of the surface portions excited by the received optical power.

The imaging surfaces are of a type sensitive to the spectral region occupied by light included within the parallel light beams L. In the exemplary embodiment, the optical energy utilized has a nominal wavelength of approximately 1.3 to 1.5 micrometers. However, it will be appreciated by those skilled in the art that optical energy having differing wavelengths may be utilized to practice the subject invention. In the case of optical energy having different wavelengths, other types of imaging devices may be successfully employed.

Within the context of optical energy having a nominal wavelength of substantially 1.3 to 1.5 micrometers, the inventors have determined that an appropriate imaging surface comprises an Indium Gallium Arsenide (InGaAs) material.

There need not be a 1-to-1 correspondence between imaging surface pixels and individual beams of light within the parallel light beam L. Rather, in a preferred embodiment of the invention, each beam of light within the parallel light beams L imparts optical energy to several pixels on the imaging surface of the imaging devices. In this manner, complex beam aiming and pixel positioning issues are avoided. The imaging devices discern individual light beams by, for example, discerning "dark" regions separating the illuminated pixels.

The amount of excitation energy imparted to the surface elements of the imaging devices corresponds to at least an aggregate power level of the parallel light beam directed towards the imaging devices. In one embodiment a relatively inexpensive or coarse imaging device is used which may not be able to provide sufficient image resolution to discern individual beams of light. In this embodiment, the total or aggregate energy imparted to the imaging device is processed by the respective controller. In another embodiment, the imaging device is made to discern individual beams of light within the parallel light beam exciting the imaging device surface. In this embodiment, the controller associated with the imaging device may perform processing functions adapted to recognizing the energy imported by individual beams of light within the parallel light beams L. One such process comprises excitation energy imported to pixels within the imaging device surface that are not associated with individual beams of light. Such energy may be caused by scattering, misalignments not corrected by the beam mask 260 or other effects.

In one embodiment, each parallel light beam has associated with it (i.e., excites) a respective one or more pixels within an imaging surface of a camera. In this embodiment, excitation energy induced in the image surface corresponding to a particular parallel light beam is correlated to predefined optical energy levels such that the power level associated with the particular parallel light beam may be determined.

Figure 6:
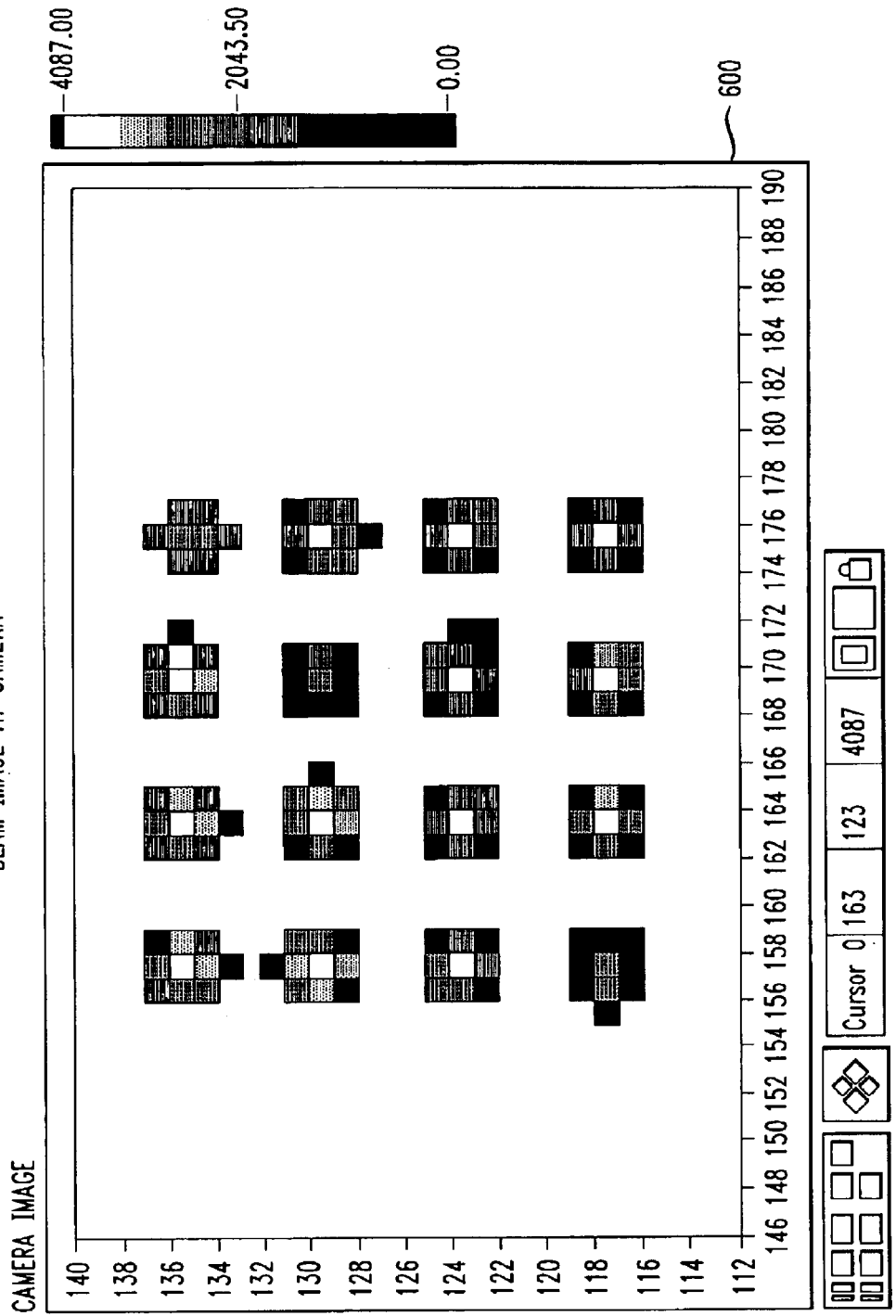
FIG. 6 depicts a graphical representation of optical energy strength imparted to an imaging surface via individual optical fibers in a fiber bundle.

FIG. 6 depicts a graphical representation of optical energy strength imparted to an imaging surface via individual fibers within a fiber bundle. Specifically, the image 600 of FIG. 6 depicts a 4×4 array where each element in the array comprises a representation of the optical energy imparted to an imaging surface via a respective optical fiber within a 4×4 (cross-sectionally described) fiber bundle. It is noted that lighter (i.e. towards white) pixels denote higher optical energy while darker (i.e. towards black) pixels indicate a lower energy. By determining brightness or luminous level of each pixel associated with an individual light beam, an indication of the optical power of the individual light beam may be determined. Similarly, by determining the intensity level of each of the pixels associated with the individual light beams forming the fiber bundle, an aggregate power level may be determined. By comparing the aggregate (or individual) power levels as determined by the imaging devices associated with the output optical fiber bundle and the input optical fiber bundle, a further determination may be made as to the optical power loss within the switch fabric. Moreover, the optical fiber loss attributable to any one optical fiber supplying the parallel-aligned light beams may be determined in this manner.

In one embodiment of the invention of the invention, each of the pixels within a grid of pixels forming an imaging surface is processed to determine the amount of excitation energy imparted to the pixel. Thus, in this embodiment, there is no specific determination of optical power level made with respect to individual beams of light.

An image data acquisition method benefiting from the present invention comprises associating sub-regions of an imaging surface with respective sources of excitation energy, selectively extracting image data (such as luminance data or chrominance data or a combination thereof) from each of the sub-regions, averaging or normalizing excitation level data within each of the sub-regions to provide respective average sub-region image data, comparing the respective sub-region image data to one or more threshold levels and triggering direct memory transfer of (or simply writing) the sub-region aggregate average pixel data to a memory. The sub-regions may collectively represent the entire imaging surface or portions of the imaging surface.

Of the various embodiments, which incorporate the teachings of the present invention, have been shown and described in detail herein, those skilled in the art can readily device many other varied embodiments that still incorporate these teachings. As such, the appropriate scope of the invention is to be determined according to the claims, which follow herewith.

What is claimed is:

1. A method, comprising:
   arranging a plurality of light beams according to a parallel configuration;
   diverting a first portion of said parallel light beams to a first imaging device;
   propagating a remaining portion of said parallel light beams through a medium;
   diverting a first portion of the propagated parallel light beams to a second imaging device;
   determining an optical loss parameter using imaging data provided by said first and second imaging devices; and
   adapting beam steering parameters associated with the medium to reduce optical loss in response to the optical loss parameter.

2. The method of claim 1, wherein said imaging devices include Indium Gallium Arsenide (InGaAs) imaging surfaces.

3. The method of claim 1, wherein said beam steering parameters include mirror alignment parameters, wherein at least one mirror is used to propagate said remaining portion of said parallel light beams through said medium.

4. The method of claim 1, wherein said medium comprises a free-space medium.

5. The method of claim 3, wherein said steps of determining said optical loss parameter and adapting said beam steering parameters are iteratively performed until said determined optical loss parameter is less than a threshold level.

6. The method of claim 1, wherein each of said first and second imaging devices include an imaging surface defined by a plurality of pixels, each of said light beams within said plurality of light beams optically exciting at least one pixel on said imaging surfaces.

7. The method of claim 6, wherein:
   the optical excitement levels of pixels within said imaging surface of said first imaging device are related to an input power applied to said medium; and
   the optical excitement levels of pixels within said imaging surface of said second imaging device are related to an output power received via said medium;
   said optical medium having associated with it an insertion loss determined using said first and second imaging device optical excitement levels.

8. The method of claim 1, wherein each of said first and second imaging devices comprises a respective imaging surface, said imaging surfaces comprising respective arrays of picture elements, each of said picture elements providing an output level proportional to an excitation level induced by received optical energy.

9. A method for determining a loss parameter of an optical device, comprising:
   imparting a first portion and a remaining portion of a plurality of substantially parallel light beams to, respectively a first imaging device and said optical device, said optical device providing a propagated plurality of substantially parallel light beams at an output;
   imparting a first portion of said propagated plurality of substantially parallel light beams to a second imaging device; and
   determining an optical loss parameter using imaging data provided by said first and second imaging devices,
   wherein each of said first and second imaging devices include an imaging surface defined by a plurality of pixels, each of said light beams within said plurality of light beams optically exciting at least one pixel on said imaging surfaces.

10. The method of claim 9, wherein:
    the optical excitement levels of pixels within said imaging surface of said first imaging device are related to an input power applied to said optical device; and
    the optical excitement levels of pixels within said imaging surface of said second imaging device are related to an output power received via said optical device;
    said insertion loss being determined using said first and second imaging device optical excitement levels.

11. A method for determining a loss parameter of an optical device, comprising:

imparting a first portion and a remaining portion of a plurality of substantially parallel light beams to, respectively a first imaging device and said optical device, said optical device providing a propagated plurality of substantially parallel light beams at an output;

imparting a first portion of said propagated plurality of substantially parallel light beams to a second imaging device; and determining an optical loss parameter using imaging data provided by said first and second imaging devices, wherein:

each of said first and second imaging devices include an imaging surface defined by a plurality of pixels, each of said light beams within said plurality of light beams optically exciting respective pluralities of pixels;

said loss parameter being determined by comparing the optical energy imparted to said pluralities of pixels of said second imaging device pixels to the optical energy imparted to said respective pluralities of pixels of said first imaging device.

12. The method of claim 11, wherein said comparison is adapted according to the relative percentage of total optical energy imparted to said first and second imaging surfaces.

13. A power monitoring apparatus, comprising:

a first imaging device, for receiving a first portion of optical energy supplied by a plurality of parallel light beams and responsively providing a first indicium of received optical energy;

a steering device, for causing the propagation through a medium of a remaining portion of said optical energy supplied by said plurality of parallel light beams; and a second imaging device, for receiving at least a first portion of the optical energy propagated through said medium and responsively providing a second indicium of received optical energy;

said first and second indicia of received optical energy being sufficient to determine an optical loss parameter associated with said medium for adapting said steering device to reduce optical loss.

14. The apparatus of claim 13, wherein said imaging devices include Indium Gallium Arsenide (InGaAs) imaging surfaces.

15. The apparatus of claim 13, wherein said steering device comprises a micro-electromechanical system (MEMS)-based mirror.

16. The apparatus of claim 15, further comprising:

a plurality of MEMS-based mirrors forming a MEMS-based mirror array, each mirror within said MEMS-based mirror array having steering parameters adapted in response to respective determined optical loss parameters associated with the propagation of optical energy through said medium.

17. The method of claim 9, wherein said imaging devices include Indium Gallium Arsenide (InGaAs) imaging surfaces.

18. The method of claim 11, wherein said imaging devices include Indium Gallium Arsenide (InGaAs) imaging surfaces.

* * * * *